Jan. 16, 1968  R. R. THOMPSON ET AL  3,364,452
FOOT-CONTROLLED POTENTIOMETER SYSTEM
FOR SEWING MACHINE MOTORS

Filed Oct. 11, 1965  2 Sheets-Sheet 1

WITNESS
William Martin Jr.

INVENTORS
Albert N. Cook
Ronald R. Thompson
BY Marshall J. Breen
ATTORNEY

Jan. 16, 1968
R. R. THOMPSON ET AL
FOOT-CONTROLLED POTENTIOMETER SYSTEM
FOR SEWING MACHINE MOTORS
3,364,452
Filed Oct. 11, 1965
2 Sheets-Sheet 2
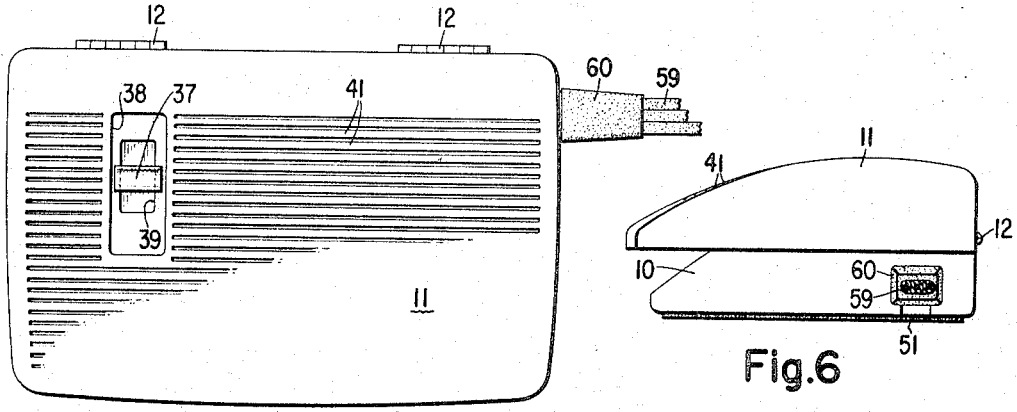
Fig.5
Fig.6
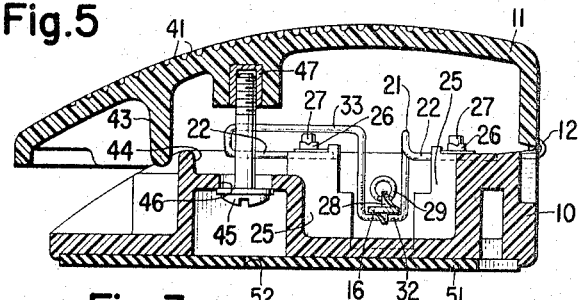
Fig.3
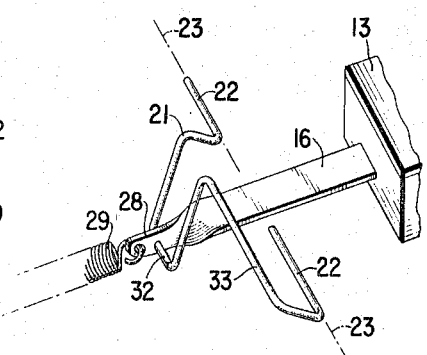
Fig.7
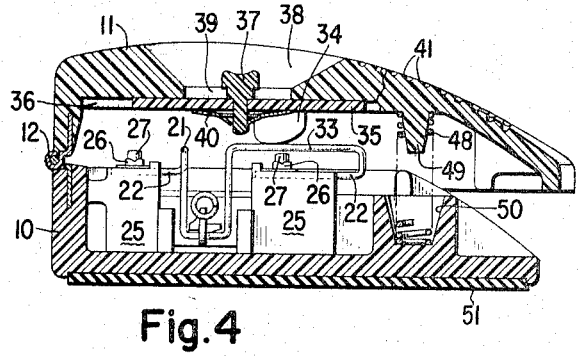
Fig.4
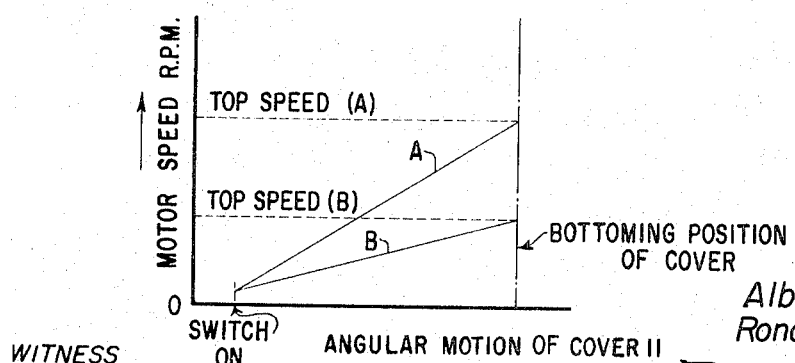
Fig.8
WITNESS
William Martin Jr.
INVENTORS
Albert N. Cook
Ronald R. Thompson
BY Marshall J. Breen
ATTORNEY United States Patent Office 3,364,452
Patented Jan. 16, 1968

3,364,452
FOOT-CONTROLLED POTENTIOMETER SYSTEM
FOR SEWING MACHINE MOTORS
Ronald R. Thompson, Pluckemin, and Albert N. Cook,
Madison, N.J., assignors to The Singer Company, New
York, N.Y., a corporation of New Jersey
Filed Oct. 11, 1965, Ser. No. 494,703
6 Claims. (Cl. 338—108)

This invention relates to foot-controllers of the type used for controlling the speed of electrical motors driving sewing machines.

The conventional foot-controller, as presently manufactured, comprises an adjustable resistance capable of carrying the full motor current with operator-influenced means for adjusting the value of said resistance. With the recent advent of silicon controlled rectifiers and circuits using them for controlling and regulating the speed of electric motors, the motor current control function is taken over by the controlled rectifier which itself is controlled by firing current which is substantially smaller than the motor current so controlled. The result is that the adjustable resistance element for controlling the rectifier may be much smaller physically than the conventional foot-controller resistance. It thus becomes possible and has been shown to be desirable to place the controller resistance and the entire control circuit including the rectifier within the same volume enclosure as was previously required for the control resistance alone and to gain the advantage of substantially better speed regulation in the bargain. This is shown and described in a copending U.S. patent application Ser. No. 458,857, filed May 26, 1965 and assigned to the same assignee as the present invention.

The problem then becomes one of providing simple but rugged means for translating the operator-influenced motion of the controller into consistently repeatable motion of the adjustment actuator of a small control resistance without undue stress in the parts and consistent with ease of assembly thereof.

It is an object of this invention therefore to provide an electric motor foot-controller having a fixed built-in regulating circuit module in special combination with an operator-adjustable resistance for manually controlling and automatically regulating the motor speed, and with means for selecting a desirable operating characteristic therefor.

It is a further object of this invention to provide special structure for translating the angular motion of a hinged member into accurately and consistently repeatable resistance variations of a relatively small control potentiometer without inducing any stresses which would adversely affect its useful life.

It is a still further object of this invention to provide an electric motor foot-controller having built-in circuit means for speed-responsive regulation and with special structural features which result in an easy open-access, drop-in type of assembly.

Other objects of the invention will be readily apparent when the following description is considered in connection with the accompanyng drawings.

In the drawings:

FIG. 3 is a transverse section taken substantially on line 3—3 of FIG. 1

FIG. 4 is a transverse section taken substantially on line 4—4 of FIG. 1.

FIG. 5 is a top plan view of the device of FIG. 1 with the cover closed.

FIG. 6 is a right side elevation view of the device of FIG. 5.

FIG. 7 is a detailed perspective view showing the relation of certain specific elements of the device of FIG. 1.

FIG. 8 is a diagram showing comparison performance characteristics of a device of this invention under differently adjusted conditions.

Figures 1, 2:
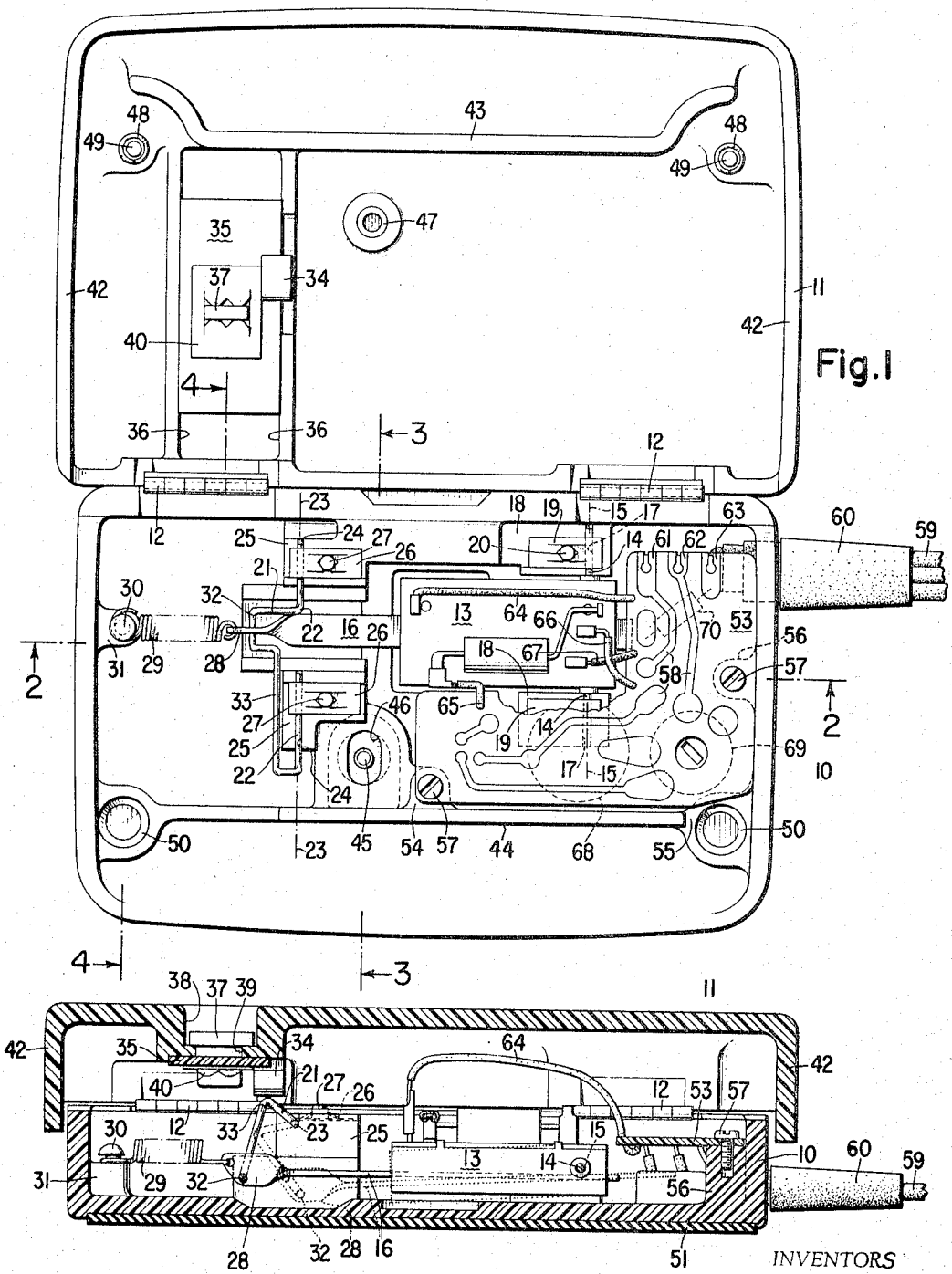
FIG. 1 is a top plan view of a device embodying the invention with the cover open.
FIG. 2 is a longitudinal vertical section with the cover of the controller closed, taken substantially on line 2—2 of FIG. 1

Referring now to FIG. 1, a preferred embodiment of this invention comprises a generally rectangular box 10 made of molded insulation material and a cover 11 of the same material secured pivotally thereto by means of hinges 12—12.

An adjustable electrical control element, preferably in the form of a linear motion or translatory potentiometer 13, has stub shafts 14—14 secured in alignment at opposite sides to form a pivotal axis 15 therefor. Extending from one end of the potentiometer 13 is a flat actuating rod 16 which moves in an endwise motion, preferably linear, normal to the pivotal axis 15 to vary the resistance of the potentiometer 13. The stub shafts 14—14 are journaled in slots 17 formed in bosses 18 molded into the box 10 and are retained therein by sheet-metal fasteners 19 pushed onto lugs 20 formed on the bosses 18. A potentiometer of this general type is shown and described in the U.S. Patent No. 2,668,218.

A bell-crank lever 21 having a special shape, as shown clearly in FIG. 7, is formed with aligned spaced limbs 22 which define a pivotal axis 23 therefor. The limbs 22 are journaled in aligned slots 24 formed in bosses 25 and are retained therein by sheet-metal fasteners 26 pushed onto lugs 27.

The free end of the actuating rod 16 is twisted 90 degrees to present an upstanding portion 28. A tension spring 29, anchored at one end by a drive screw 30 secured in a boss 31, is connected at its opposite end to said upstanding portion 28. The spring 29 thus biases the rod 16 to its fully-extended position, which corresponds to a "circuit-open" condition of potentiometer 13.

The bell-crank lever 21 has an off-set limb 32 which passes through an aperture in the portion 28 of rod 16 to form a journaled connection therewith. A second off-set limb 33 of the bell-crank lever 21 is engaged by a lug 34 slidably secured to the cover 11. It will be seen from FIG. 2 that pressure applied to the cover 11 (as from the operator's foot) will be transmitted through lug 34 to the limb 33 and will cause the bell-crank lever 21 to turn counter-clockwise about pivotal axis 23 as viewed in FIG. 2. The off-set limb 32 will retract the actuating rod 16 against the bias of spring 29 to close a circuit through and change the effective resistance of the potentiometer 13 as desired. It will be seen that, with the arrangement above described, the rod 16 is forced to move in an angular direction, as shown dotted in FIG. 2, which movement is freely permitted by virtue of the pivotal mounting of the potentiometer 13 about the axis 15.

In this manner no bending stress is imparted to the rod 16 which would cause failure and, with respect to the potentiometer, its motion is completely linear.

The lug 34 is formed on a plate 35 which is slidable in a groove 36 formed on the inside of the cover 11. A finger-piece 37 set into a depression 38 in the outside of the cover 11 passes through a slotted portion 39 and is secured to the plate 35 by means of a sheet-metal push-on fastener 40 as clearly seen in FIGS. 1, 2 and 4.

It will be seen that movement of the finger-piece 37 increases or decreases the effective lever-arm distance of the lug 34 with respect to the axis of the hinges 12—12. Thus the total downward travel of lug 34, (which governs the travel of rod 16) for a given angular movement of the cover 11 about the hinge axis may be adjusted so that better low-speed control with an adjustable limit to the top speed can be obtained. Thus the operator can, within limits, change the performance characteristic of the controller to best suit his needs.

This is shown diagrammatically in FIG. 8 wherein the curves A and B indicate the motor speed as a function of the angular motion of the cover 11 about the hinges 12—12. Curve A shows the characteristic obtained when the finger-piece 37 is in its lowest position in slot 39 as viewed in FIG. 5 and curve B is the characteristic for the finger-piece 37 in its topmost position in slot 39. The area between curves A and B represents the region of adjustability within which the operator may obtain any characteristic suitable for the type of work to be done. It will be noted that, with curve B, the speed change for a given angular motion of cover 11 is substantially less than for curve A, but the top motor speed is also less with curve B. Thus, if accurate control at low speeds is desired, the characteristic of curve B would be chosen. From the above it will be understood that, by simply moving the finger-piece 37, the controller may be adjusted for selecting the motor speed range over which it is desired that the control element 13 be effective.

The cover 11 is formed with a convex curved top surface, as shown in FIGS. 3 and 4, and is horizontally scored to present a finely spaced ribbed patttern 41. The sides 42 of the cover 11 overhang and overlap the sides of the box 10 as seen in FIG. 2 and a web 43 formed on the cover 11 overlaps a web 44 formed on the box 10, as seen in FIG. 3. These overlapping elements provide safety against inadvertent human access to the interior of the controller which contains live electrical components and, at the same time, they do not interfere with the flow of ventilating air which removes any heat generated by the components.

A self-locking headed screw 45, passed through an aperture 46 in the bottom of the box 10, is threaded into an insert 47 molded into the cover 11 as seen best in FIG. 3. The screw 45 is adjusted to determine an initial rest position for the cover 11 as provided by compression springs 48—48, which surmount posts 49—49 formed in the cover 11 and are seated in pockets 50—50 formed in the box 10, as seen best in FIG. 4.

A rubber pad 51 is secured to the bottom of box 10 to provide increased friction with and prevent sliding relative to any surface on which the controller rests. Access to the screw 45 for adjustment thereof may be gained through a slit 52 made in the pad 51 or preferably the slit 52 is omitted and the imperforate pad 51 is applied after factory adjustment of screw 45 to prevent further tampering by the customer.

An L-shaped circuit board 53 may be supported at three points on raised bosses 54, 55, 56 and is secured to the box 10 by means of screws 57—57. The board has printed circuit elements 58 on the top surface, as viewed in FIG. 1, and carries on its bottom surface various electrical circuit components 68, 69 and 70, component 69 comprising an adjustable element which permits circuit compensation in the final assembly. A three-wire line cord 59 for remote connection to the motor and a source of voltage, enters through a strain relief bushing 60 in the side of the box 10, as seen in FIG. 6, and electrical connections from the line cord to the circuit board 53 are made by soldering to slotted conductors 61, 62, 63. Electrical connections between the potentiometer 13 and the circuit board 53 are made by means of flexible insulated conductors 64, 65, 66 and 67, soldered to the printed circuit at the board end and having push-on terminals at the potentiometer end. This enables the potentiometer 13 to freely pivot about the axis 15, even though being electrically connected to stationary electrical circuit components.

It will be seen that the assembly of all parts is greatly facilitated by the open-access to the box 10 with the cover 11 open. The parts are dropped in from the top and are secured by simple operations from one position. The circuit board 53 with all components secured is applied last and circuit connections completed through the push-on terminals provided.

Having thus described the nature of the invention, what we claim herein is:

1. A speed controller for electric motors comprising an insulated box, an insulated cover hinged to said box, spring and stop means biasing said cover in an adjustable initial position in the absence of pressure on said cover, circuit means fixedly mounted in said box, a potentiometer pivotally mounted in said box, a linear motion actuator for said potentiometer, crank means connected to said actuator and pivotally mounted in said box, means secured to said cover and in engagement with said crank means for imparting linear endwise and angular movement to said actuator responsively to pressure exerted on said cover, and flexible conducting leads electrically connecting said fixed circuit means with said potentiometer to permit the free angular movement of the potentiometer.

2. A speed controller for electric motors comprising an insulated box, an insulated cover for said box, hinges connecting said cover to said box to provide a hinge axis for said cover, a potentiometer having a linear motion actuator, means mounting said potentiometer in said box on a pivotal axis lying in a plane normal to said hinge axis, crank means operatively connected to said actuator and mounted in said box on a pivotal axis positioned parallel to the pivotal axis of said potentiometer, and lug means mounted on said cover for sliding frictional adjustment in a direction towards and away from said hinge axis, said lug means being in operative engagement with said crank means to impart linear endwise and angular motion to said actuator responsively to motion of said cover about its hinge axis.

3. A speed controller for electric motors comprising an insulated box, an insulated cover for said box, hinges connecting said cover to said box to provide a pivotal axis for said cover, a potentiometer having a linear motion actuator, means pivotally mounting said potentiometer in said box, crank means operatively connected to said actuator and pivotally mounted in said box, said crank means having an offset limb which extends in a plane normal to the pivotal axis of said cover, and lug means mounted on said cover for sliding adjustment thereon toward and away from said hinge axis in the plane of the offset limb, said lug means being in contact engagement with said offset limb in the closed position of said cover to impart linear endwise and angular motion to said actuator responsively to motion of said cover about its pivotal axis.

4. A speed controller for electric motors comprising an insulated box, an insulated cover hinged to said box, a potentiometer pivotally mounted in said box, a linear motion actuator for said potentiometer, means imparting linear endwise and angular motion to said actuator responsively to motion of said cover about its hinge axis, fixed unitary circuit means secured in said box adjacent to said potentiometer, and flexible insulated conductors electrically connecting said circuit means with said potentiometer to permit free angular motion of said potentiometer about its pivotal axis whereby said actuator has only endwise linear motion with respect to said potentiometer.

5. A speed controller for electric motors comprising an insulated box, an insulated cover hingedly secured to said box for angular telescopic motion relative thereto, a translatory potentiometer pivotally mounted in said box, a linear motion actuator for said potentiometer, and crank means mounted on a pivotal axis in said box and having two limbs offset from and parallel to said pivotal axis, one of said limbs being operatively connected to said actuator, the other of said limbs being in contact engagement with said cover whereby motion of said cover about its hinge axis imparts an endwise motion to said actuator with respect to said potentiometer.

6. A speed controller for electric motors comprising a base formed of insulating material and having an open-topped box-like configuration, a cover formed of insulating material and having an open-bottomed box-like configuration, said cover hinged along one of its edges to said base and arranged to telescope therewith when it is moved on its hinge axis toward said base, spring means for biasing said cover away from said base into a non-operative position in the absence of pressure on said cover, circuit means fixedly mounted within said controller and including an adjustable electrical control element, and means operatively connecting said adjustable electrical control element to said cover whereby movement of the cover under pressure exerted thereon effects adjustment of said control element, said last named means being adjustable.

References Cited

UNITED STATES PATENTS 2,536,012  12/1950  Turner _____ 338—108 X
2,988,720  6/1961  Voorlas _____ 338—108

JOHN F. COUCH, *Primary Examiner.*

W. E. RAY, *Assistant Examiner.*